United States Patent
Egawa et al.

(10) Patent No.: US 7,370,796 B2
(45) Date of Patent: May 13, 2008

(54) LASER PROCESSING SYSTEM

(75) Inventors: Akira Egawa, Gotenba (JP); Kazuhiro Suzuki, Yamanashi (JP); Motohiko Sato, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 180 days.

(21) Appl. No.: 11/349,254

(22) Filed: Feb. 8, 2006

(65) Prior Publication Data
US 2006/0178770 A1    Aug. 10, 2006

(30) Foreign Application Priority Data
Feb. 9, 2005   (JP)   ............................. 2005-033044

(51) Int. Cl.
*G06K 7/10*   (2006.01)
*G06K 7/14*   (2006.01)
(52) U.S. Cl. ...................... 235/454; 235/494
(58) Field of Classification Search ................ 235/454, 235/494, 435; 700/166, 165
See application file for complete search history.

(56) References Cited

U.S. PATENT DOCUMENTS

| | | | |
|---|---|---|---|
| 2001/0050312 A1* | 12/2001 | Koide | 235/454 |
| 2006/0043184 A1* | 3/2006 | Fukuchi et al. | 235/454 |
| 2006/0090848 A1* | 5/2006 | Koga et al. | 156/345.11 |
| 2006/0113392 A1* | 6/2006 | Otsuka et al. | 235/462.36 |
| 2007/0023404 A1* | 2/2007 | Takahashi et al. | 219/121.78 |

FOREIGN PATENT DOCUMENTS

JP   2004-167549   6/2004

* cited by examiner

*Primary Examiner*—Thien M. Le
*Assistant Examiner*—Edwyn Labaze
(74) *Attorney, Agent, or Firm*—Drinker Biddle & Reath LLP

(57) ABSTRACT

A laser processing system including a laser processing machine capable of operating along an inherent control axis, an axis driving section driving the control axis of the laser processing machine, a laser oscillator supplying a laser beam to the laser processing machine, a control unit controlling the axis driving section and the laser oscillator, and a transfer line connecting the axis driving section and the laser oscillator to the control unit in a daisy-chain mode. The control unit includes a data preparing section preparing, from a given laser processing program, motion data commanded to the axis driving section and laser output-condition data commanded to the laser oscillator; a data converting section converting the motion data and the laser output-condition data, prepared by the data preparing section, into serial data including the motion data and the laser output-condition data described in a time-series fashion, based on a communication data format common to the axis driving section and the laser oscillator; and a data transmitting section transmitting the serial data, obtained by the data converting section, to the transfer line at a predetermined command cycle common to the motion data and the laser output-condition data included in the serial data.

7 Claims, 6 Drawing Sheets

LASER PROCESSING SYSTEM

BACKGROUND OF THE INVENTION

1. Field of the Invention

The present invention relates to a laser processing system.

2. Description of the Related Art

In laser processing systems, it is known that a laser processing machine capable of operating along an inherent control axis, such as orthogonal three axes of a machine tool or a rotation axis of a manipulator, is provided. This type of laser processing system is generally provided with an axis driving section (including a servo-amplifier and a servomotor) for driving the control axis of the laser processing machine, a laser oscillator for supplying a laser beam to the laser processing machine, a control unit for controlling the axis driving section and the laser oscillator, and other peripheral devices.

In the above conventional laser processing system, the control unit is usually connected to the axis driving section, the laser oscillator and the other desired peripheral devices, by using mutually different interfaces. The control unit sends a motion command to the servo-amplifier of the desired axis driving section so as to operate the servomotor, at a predetermined command cycle (such as a interpolation cycle in a numerical control) in accordance with a given laser processing program, and drives the desired control axis so as to shift, along a designated path, a table on which a material to be processed is mounted or a processing nozzle for emitting a laser beam. At the same time, the control unit sends a command regarding various output conditions, such as an emission, a halting, a peak power, a frequency, etc., of a laser beam, to the laser oscillator, at a command cycle usually identical to the cycle of the axis motion command, in accordance with the laser processing program. Thus, the laser oscillator supplies a laser beam of a desired power to the laser processing machine at a desired timing during the operation of the laser processing machine, so as to make the laser processing machine execute laser processing.

In the control unit, motion command data (referred to as motion data in the present application) adapted to be sent to the servo-amplifier and output-condition command data (referred to as laser output-condition data, in the present application) adapted to be sent to the laser oscillator are simultaneously prepared on the basis of the given laser processing program. However, there usually are differences in transfer cycles (i.e., inherent transfer timings) and transfer speeds, between an interface connected to the servo-amplifier and an interface connected to the laser oscillator, both provided in the control unit, so that a time lag arises between the time when the servo-amplifier receives the command and the time when the laser oscillator receives the command. The time lag in association with the data transfer may deteriorate a laser processing accuracy.

For example, in some cases, in order to decrease the cycle time of a laser processing, a desired laser processing is carried out by repeating the emission and halting of a laser beam while operating the laser processing machine at an approximately constant speed. In this case, there is a concern about the fact that a starting point and an ending point of an actual laser processing on the material to be processed is deviated from a target position, due to the above-described time lag in relation to the data transfer. Further, the time of changing a laser output condition (such as a starting or ending of a laser oscillation) designated in the processing program does not necessarily coincide with the above-described command cycle in relation to the data transmission, and, in some cases, the change of the laser output condition is commanded at a timing deviated from the command cycle. In this case, the laser oscillator cannot change the laser output condition until a next command cycle starts, which is subsequent to the cycle in which the change of the laser output condition is commanded in the data received from the control unit, so that the laser oscillator executes the change the laser output condition after a certain delay from the command timing. As a result, there is also a concern about the fact that an actual laser processing area on the material to be processed includes more or less errors relative to a designated processing area (such as a positional deviation of a starting or ending point). The processing errors in the actual processing area tend to become larger when a laser processing speed (i.e., the moving speed of the laser processing machine) increases.

Japanese Unexamined Patent Publication (Kokai) No. 2004-167549 (JP-A-2004-167549) discloses a laser processing machine configured to make it possible to change a laser output condition at a designated timing, without waiting for the start of the subsequent command cycle, in the case where the time of changing the laser output condition in a laser processing program does not coincide with a command cycle of a data transmission. The laser processing machine is configured to calculate a time, on the laser processing program, from the start of a command cycle (or an interpolation cycle), including a changing command of a laser output condition, to the issuance of the command for changing the laser output condition, and, at an instant when the calculated time is spent from the start of the command cycle, to actually command the change of the laser output condition. With this arrangement, it is possible to eliminate a processing error in the actual processing area due to the delay in changing of the laser output condition.

As described above, in order to perform a high-precision processing in the laser processing machine, it is desired to accurately switch or change the various output conditions, such as the emission, the halting, the peak power, the frequency, etc., of a laser beam at a target position, even when the laser processing machine is continuously operating. However, in the conventional laser processing system, a processing error may arise in the actual processing area due to the time lag in association with the data transfer for the axis driving section and for the laser oscillator. The processing error due to the time lag relating to the data transfer is not so serious in a processing speed range in a general or conventional laser processing machine. However, due to a recent development in a laser processing technique or a servo technique, the processing speed of the laser processing machine is improved remarkably and, therefore, the deterioration in a processing accuracy due to the above-described factors becomes more significant.

In order to minimize the processing error due to the time lag in the data transfer, it is effective to shorten a data transfer cycle or increase a data transfer speed, at the individual interfaces in the control unit, respectively connected to the axis driving section and the laser oscillator, which may, however, increase the cost of building the system. On the other hand, the technique described in JP-A-2004-167549 makes it possible to change the laser output condition at a designated timing, without waiting for the subsequent command cycle, in the case where the time of changing the laser output condition in the laser processing program does not coincide with the command cycle of the data transmission. However, based on this technique, it is also difficult to solve the problem of time lag in the data transfer due to the difference of the interfaces in the control unit.

SUMMARY OF THE INVENTION

It is an object of the present invention to provide a laser processing system including a control unit for controlling both an axis driving section driving a control axis in a laser processing machine and a laser oscillator supplying a laser beam to the laser processing machine, which can substantially eliminate a processing error due to a time lag in a data transfer in relation respectively to the axis driving section and the laser oscillator, to perform a laser processing with a high accuracy, and can be built at a low cost.

To accomplish the above object, the present invention provides a laser processing system comprising a laser processing machine capable of operating along an inherent control axis; an axis driving section driving the control axis of the laser processing machine; a laser oscillator supplying a laser beam to the laser processing machine; a control unit controlling the axis driving section and the laser oscillator; and a transfer line connecting the axis driving section and the laser oscillator to the control unit in a daisy-chain mode; the control unit comprising a data preparing section preparing, from a given laser processing program, motion data commanded to the axis driving section and laser output-condition data commanded to the laser oscillator; a data converting section converting the motion data and the laser output-condition data, prepared by the data preparing section, into serial data including the motion data and the laser output-condition data described in a time-series fashion, based on a communication data format common to the axis driving section and the laser oscillator; and a data transmitting section transmitting the serial data, obtained by the data converting section, to the transfer line at a predetermined command cycle common to the motion data and the laser output-condition data included in the serial data.

In the above laser processing system, the control unit may further comprise a signal generating section generating a synchronization signal representing a transmission timing for the serial data in accordance with the command cycle. In this arrangement, the data transmitting section may transmit the serial data to the transfer line in a manner to follow the synchronization signal generated by the signal generating section.

The above laser processing system may comprise a plurality of axis driving sections, each of which is the driving section, and a plurality of transfer lines connecting respective groups of axis driving sections, into which the plurality of axis driving sections are divided, to the control unit in a daisy-chain mode. In this arrangement, the control unit may comprise a plurality of data transmitting sections, each of which is the data transmitting section, synchronously transmitting the serial data to the plurality of transfer lines at the command cycle.

Also, in the above laser processing system, the data preparing section may prepare command timing data for commanding the laser output-condition data included in the serial data to the laser oscillator at a timing deviated from the command cycle. In this arrangement, the data converting section may convert the laser output-condition data into the serial data by attaching the command timing data to the laser output-condition data.

The present invention further provides a laser processing system comprising a laser processing machine capable of operating along an inherent control axis; an axis driving section driving the control axis of the laser processing machine; a laser oscillator supplying a laser beam to the laser processing machine; a control unit controlling the axis driving section and the laser oscillator; and a transfer line common to the axis driving section and the laser oscillator and connecting the axis driving section and the laser oscillator to the control unit; the control unit comprising a data preparing section preparing, from a given laser processing program, motion data commanded to the axis driving section and laser output-condition data commanded to the laser oscillator; a data converting section converting the motion data and the laser output-condition data, prepared by the data preparing section, into serial data including the motion data and the laser output-condition data described in a time-series fashion, based on a communication data format common to the axis driving section and the laser oscillator; and a data transmitting section transmitting the serial data, obtained by the data converting section, to the transfer line at a predetermined command cycle common to the motion data and the laser output-condition data included in the serial data.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
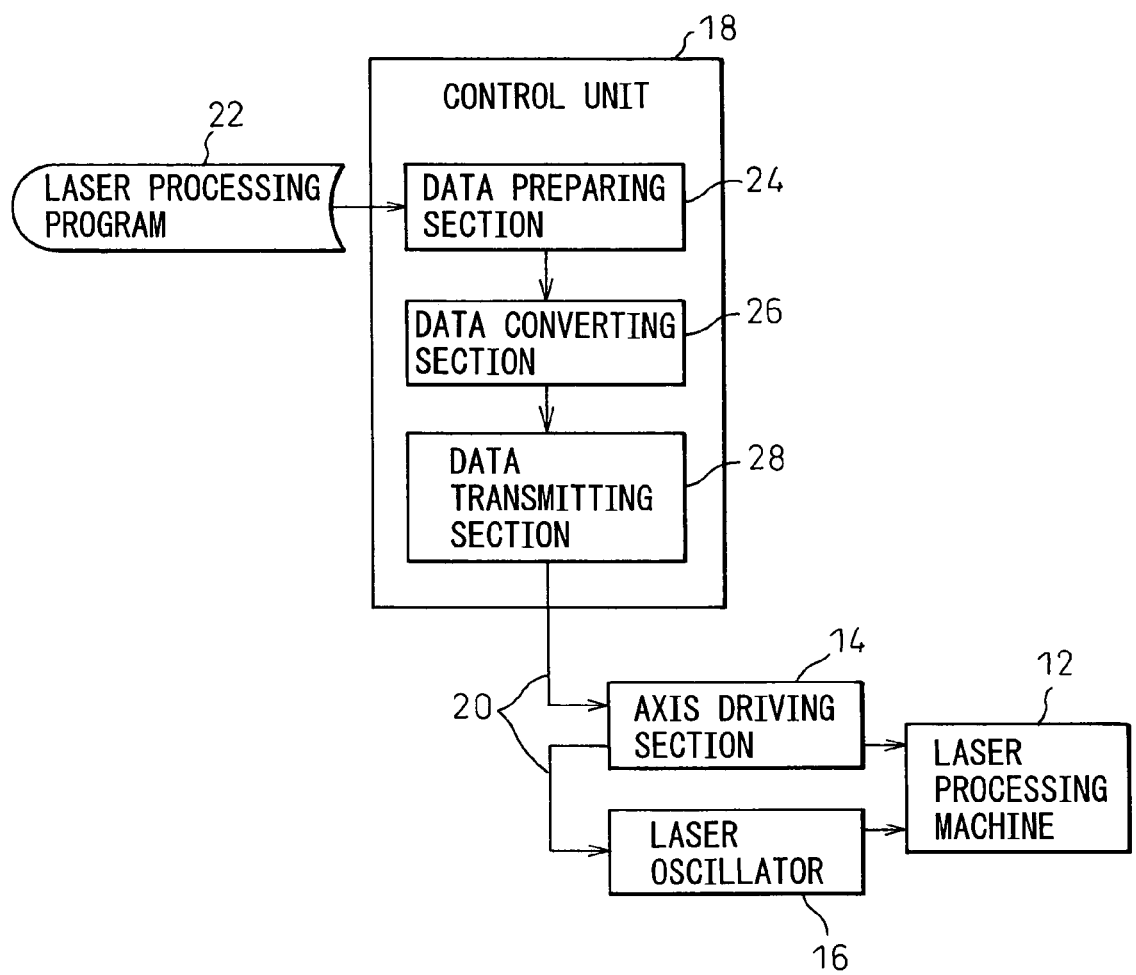
FIG. 1 is a functional block diagram showing a basic configuration of a laser processing system according to the present invention.

The embodiments of the present invention are described below in detail, with reference to the accompanying drawings. In the drawings, the same or similar components are denoted by common reference numerals.

Referring to the drawings, FIG. 1 shows a basic configuration of a laser processing system 10 according to the present invention. The laser processing system 10 includes a laser processing machine 12 capable of operating along an inherent control axis; an axis driving section 14 driving the control axis of the laser processing machine 12; a laser oscillator 16 supplying a laser beam to the laser processing machine 12; a control unit 18 controlling the axis driving section 14 and the laser oscillator 16; and a transfer line 20 connecting the axis driving section 14 and the laser oscillator 16 to the control unit 18 in a daisy-chain mode. The control unit 18 includes a data preparing section 24 preparing, from a given laser processing program 22, motion data adapted to be commanded to the axis driving section 14 and laser output-condition data adapted to be commanded to the laser oscillator 16; a data converting section 26 converting the motion data and the laser output-condition data, prepared by the data preparing section 24, into serial data in which the motion data and the laser output-condition data are described in a time-series fashion, based on a communication data format common to the axis driving section 14 and the laser oscillator 16; and a data transmitting section 28 transmitting the serial data, obtained by the data converting section 26, to the transfer line 20 at a predetermined command cycle common to the motion data and the laser output-condition data included in the serial data.

According to the laser processing system 10 having the above configuration, the axis driving section 14 and the laser oscillator 16 are connected to the control unit 18 in the daisy-chain mode through the transfer line 20, so that it is possible to provide an interface in the control unit 18 common to the axis driving section 14 and the laser oscillator 16. Further, the serial data including the motion data and the laser output-condition data, converted by using the communication data format common to the axis driving section 14 and the laser oscillator 16, is sent to the transfer line 20 at the predetermined command cycle common to the motion data and the laser output-condition data, so that it is possible to significantly decrease, or substantially eliminate, a time lag in a data transfer in relation to both the axis driving section 14 and laser oscillator 16.

The axis driving section 14 and the laser oscillator 16 sequentially obtain the desired motion data and laser output-condition data, in the order of connection in the transfer line 20, from the serial data sent to the transfer line 20. In this connection, the serial data is sent at the command cycle common to the motion data and the laser output-condition data, so that the serial data sent during one command cycle is received by both the axis driving section 14 and the laser oscillator 16, before a data transfer in the subsequent cycle is started. Accordingly, even when the axis driving section 14 and the laser oscillator 16 respectively operate at the same time as obtaining the desired data, the time lag in the data transfer in relation to the axis driving section 14 and the laser oscillator 16 decreases to a level not exceeding one command cycle (e.g., an interpolation cycle in a numerical control), so that it is possible to substantially synchronize the operations of the axis driving section 14 and of the laser oscillator 16. As a result, it is possible to substantially eliminate a processing error due to the time lag in the data transfer, and thus to perform the laser processing with a high accuracy.

Alternatively, the axis driving section 14 and the laser oscillator 16 may wait for the start of a data transfer in the next command cycle, after respectively obtaining the desired data, and may be triggered to operate at an instant when the next cycle is started, so that it is possible to fully eliminate the time lag in the data transfer for the axis driving section 14 and laser oscillator 16, and thus to accurately synchronize the operations of the axis driving section 14 and laser oscillator 16. As a result, it is possible to perform a laser processing with a higher accuracy. Further, in the present invention, means for substantially eliminate the time lag in the data transfer do not shorten the transfer cycle or increase the transfer speed in an interface in the control unit, but can apply a standard command cycle to one interface, so that it is also possible to eliminate a risk of increase in the cost for building the system. It should be noted that, in the illustrated configuration, the order of connecting the axis driving section 14 and the laser oscillator 16 in the transfer line 20 may be reversed.

Figure 2:
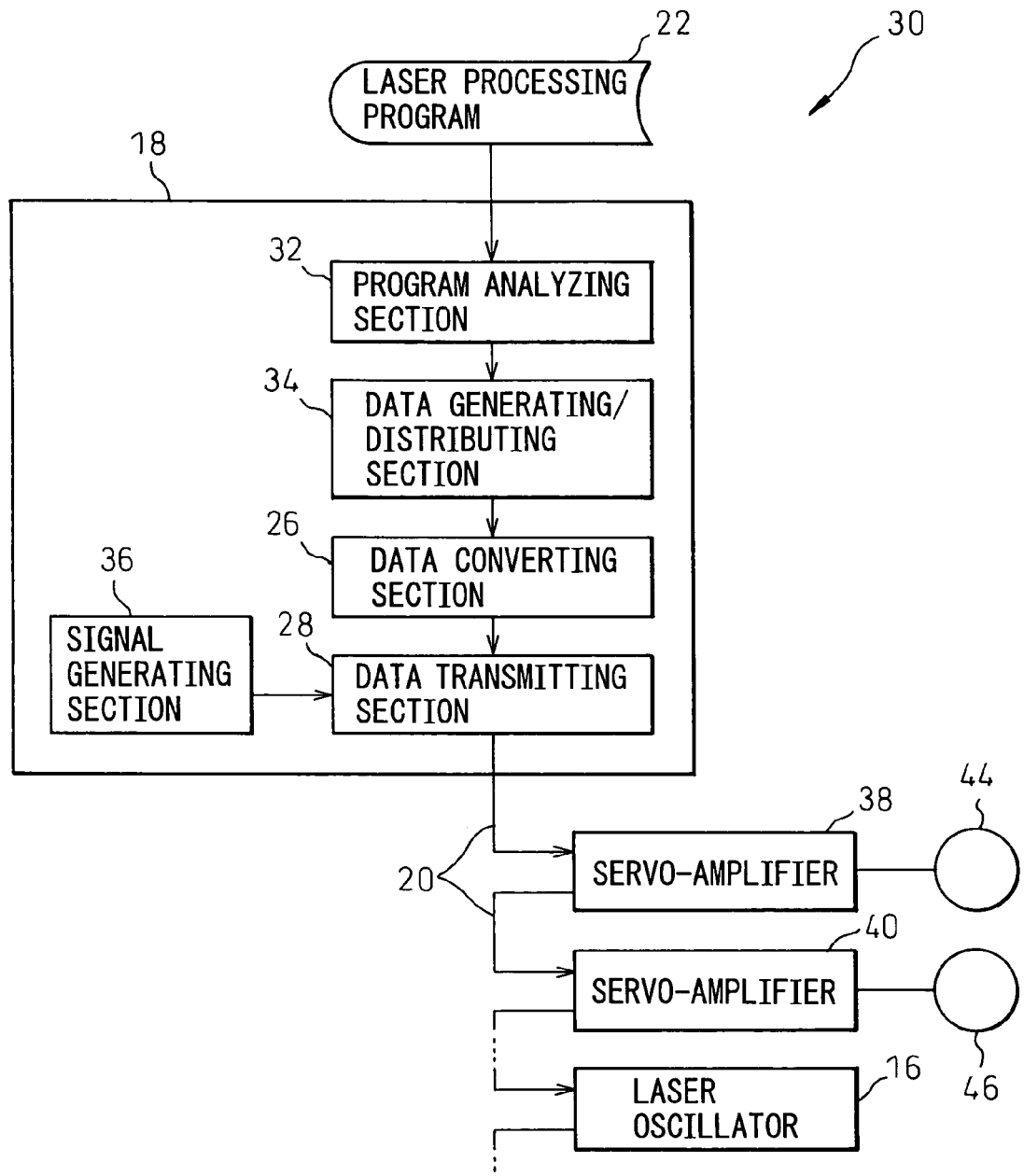
FIG. 2 is a functional block diagram showing a software configuration of a laser processing system according to a first embodiment of the present invention.
Figure 3:
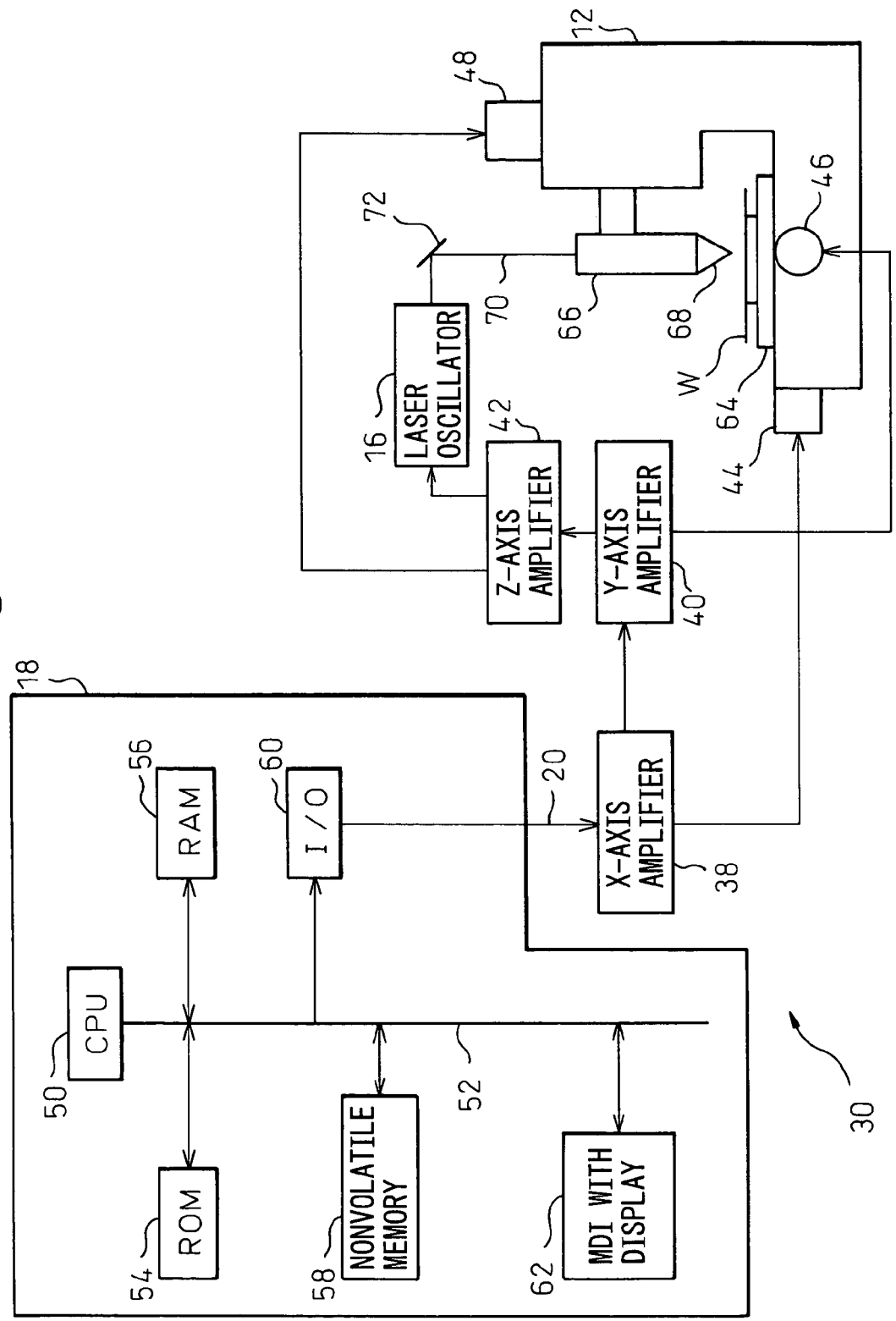
FIG. 3 is a schematic illustration showing an outline of a hardware configuration of the laser processing system of FIG. 2.

FIG. 2 shows, as a functional block diagram, a software configuration of a laser processing system 30 according to the first embodiment of the present invention, which has the above-described basic configuration. On the other hand, FIG. 3 shows an outline of a hardware configuration of the laser processing system 30. The components of the laser processing system 30 according to this embodiment, corresponding to the components of the laser processing system 10 of FIG. 1, are denoted by common reference numerals, and the explanation thereof is not repeated.

The laser processing system 30 is configured to perform a desired laser processing to a material to be processed (or a workpiece) W by the laser processing machine 12 that operates under a numerical control in an orthogonal three-axis coordinate system, as an example. As shown in FIG. 2, the control unit 18 of the laser processing system 30 includes a program analyzing section 32 and a data generating/distributing section 34, as a component corresponding to the above-described data preparing section 24. The program analyzing section 32 analyzes a laser processing program 22 including motion data for a plurality of control axes (X-axis, Y-axis and Z-axis) in the laser processing machine 12 and laser output-condition data for the laser oscillator 16. Base on the analyzing results, the data generating/distributing section 34 prepares a motion command and a laser output command, in the form of being segmented by a predetermined command cycle (i.e., an interpolation cycle of the numerical control), and distributes the commands, as interpolation command data, to the data converting section 26.

The data converting section 26 converts the distributed interpolation command data into the above-described serial data, and the data transmitting section 28 transmits the serial data to the transfer line 20 at a predetermined command cycle. The control unit 18 is further provided with a signal generating section (i.e., a clock) 36 generating a synchronization signal representing a transmission timing for the serial data in accordance with the command cycle. Therefore, the data transmitting section 28 transmits the serial data to the transfer line 20 in a manner to follow the synchronization signal generated by the signal generating section 36. According to this configuration, it is possible for the data transmitting section 28 to transmit the serial data to the transfer line 20 accurately at the predetermined command cycle following the synchronization signal.

Servo-amplifiers 38, 40 and 42 for the respective axes, which constitute the axis driving section 14, and the laser oscillator 16, are connected to the data transmitting section 28 of the control unit 18 in a daisy-chain mode through the transfer line 20. In the configuration shown in FIGS. 2 and 3, the X-axis servo-amplifier 38 first obtains motion data necessary to operate an X-axis servomotor 44 from the serial data transferred from the data transmitting section 28, and thereafter transfers the serial data to a next connected unit (i.e., the Y-axis servo-amplifier 40). Similarly, the Y-axis servo-amplifier 40 obtains motion data necessary to operate a Y-axis servomotor 46 from the serial data, and transfers the serial data to a next connected device (i.e., the Z-axis servo-amplifier 42). Similarly, the Z-axis servo-amplifier 42 obtains motion data necessary to operate a Z-axis servomotor 48 from the serial data, and transfers the serial data to a next connected device (i.e., the laser oscillator 16). The laser oscillator 16 obtains laser output-condition data necessary to operate a laser oscillation from the serial data transferred from the Z-axis servo-amplifier 42, and transfers the serial data to a next connected device (if any).

As shown in FIG. 3, the control unit 18 has a hardware configuration of a computerized numerical control (CNC) unit, and includes a central processing unit (CPU) 50 (or a processor) and several components connected to the processor 50 through a bus 52, i.e., a read-only memory (ROM) 54, a random-access memory (RAM) 56, a nonvolatile memory 58 made of a complementary metal-oxide semiconductor RAM (CMOSRAM) with a backup power supply, an input and output interface 60, and a multiple document interface (MDI) 62 (or manual input means) with a display (such as a cathode ray tube (CRT) or a liquid crystal display). The ROM 54 stores a system program for controlling the laser processing system 30 in its entirety. The nonvolatile memory 58 stores a numerical control (NC) processing program prepared by using the MDI 62 with the display, or input through an input interface (not shown). The RAM 56 is used to temporarily store data for the execution of various processes. The X-axis servo-amplifier 38, the Y-axis servo-amplifier 40, the Z-axis servo-amplifier 42 and the laser oscillator 16 are connected to the input/output interface 60 in a daisy-chain mode through the transfer line 20.

The laser processing machine 12 includes a table 64 for carrying the workpiece W, as well as a processing head 66 and a processing nozzle 68, for irradiating the workpiece W with a laser beam. The X-axis servomotor 44 for driving the table 64 in an X-axis direction (i.e., leftward and rightward directions in FIG. 3), the Y-axis servomotor 46 for driving the table 64 in a Y-axis direction (i.e., a direction crossing the right angle to a paper face of FIG. 3), and the Z-axis servomotor 48 for driving the processing head 66 and the processing nozzle 68 in a Z-axis direction orthogonal to the X-axis and the Y-axis directions, are mounted on the laser processing machine 12.

The X-axis servomotor 44 is connected to the X-axis servo-amplifier 38, the Y-axis servomotor 46 is connected to the Y-axis servo-amplifier 40, and the Z-axis servomotor 48 is connected to the Z-axis servo-amplifier 42. A position/speed detector (not shown), such as an encoder (or a pulse generator), for detecting a position and a speed is provided in each servomotor 44, 46, 48, and thereby the position and speed of each servomotor 44, 46, 48 are fed back to the corresponding servo-amplifier 38, 40, 42. Each servo-amplifier 38, 40, 42 controls the position and speed of the corresponding servomotor 44, 46, 48, based on the command from the processor 50 and the position and speed feedback signals. A current control can be further performed on the basis of a feedback signal from a current detector (not shown). As explained above, the X-axis servo-amplifier 38, the Y-axis servo-amplifier 40 and the Z-axis servo-amplifier 42 constitute a servo-control system in the laser processing system 30. In this arrangement, the data transmitting section 28 shown in FIG. 2 may be configured as a data transmitting/receiving section that also executes the reception of a feedback signal.

The laser oscillator 16 generates a laser beam 70 on the basis of the laser output-condition data included in the serial data as already described. The laser beam 70 is reflected by a bending mirror 72 disposed at a suitable position, supplied to the processing head 66, suitably collected through the processing head 66, and emitted from the processing nozzle 68 at the front end of the head to irradiate the workpiece W. The laser processing system 30 having the above configuration has characteristic effects as explained with reference to FIG. 1, and can perform a high-precision laser processing to the workpiece W.

Figure 4:
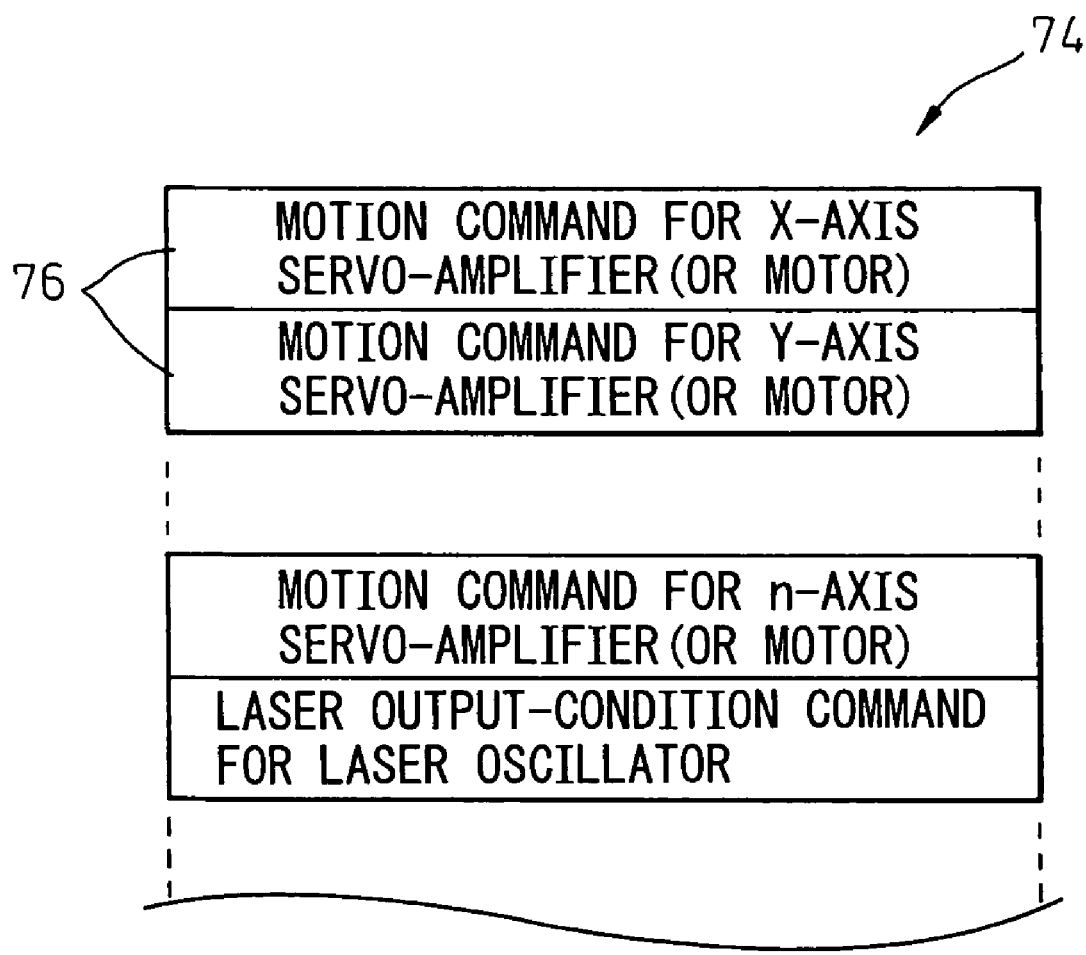
FIG. 4 is an illustration showing an example of a serial data format used in the laser processing system of FIG. 2.

FIG. 4 shows a serial data format 74 used in the laser processing system 30. In this format 74, commands 76 for several units (i.e., the servo-amplifiers 38, 40, 42, and the laser oscillator 16) connected through the transfer line 20 in a daisy-chain mode are described in rows in a time-series fashion. At an instant when a power supply is turned on, the control unit 18 confirms the types and connection order of the units connected to the transfer line 20 in the daisy-chain mode, and specifies desired data items in the serial data. In this connection, while only the servo-amplifiers 38, 40, 42 and the laser oscillator 16 are described as the units connected to the control unit 18 in the above embodiment, it is also possible to connect peripheral devices, such as an input/output unit, to the control unit 18 in the daisy-chain mode. In this arrangement, data items corresponding to the commands for the I/O unit are added to the serial data.

The daisy-chain connection mode of the data transfer line 20, as the characteristic feature of the laser processing system according to the present invention, has an upper limit on the number of units connectable through a single transfer line 20 in the daisy-chain mode, in the event that the serial data is transferred in a specific command cycle. For example, there may be a case where the laser processing machine 12 has many control axes and thereby it is difficult to connect all the axis driving sections 14, together with the laser oscillator 16, through the single transfer line 20 in the daisy-chain mode. In this case, the upper limit on the number of connectable units may be increased by increasing the data transfer speed in the interface (or the data transmitting section 28) of the control unit 18, which may, however, rise a system building cost.

Figure 5:
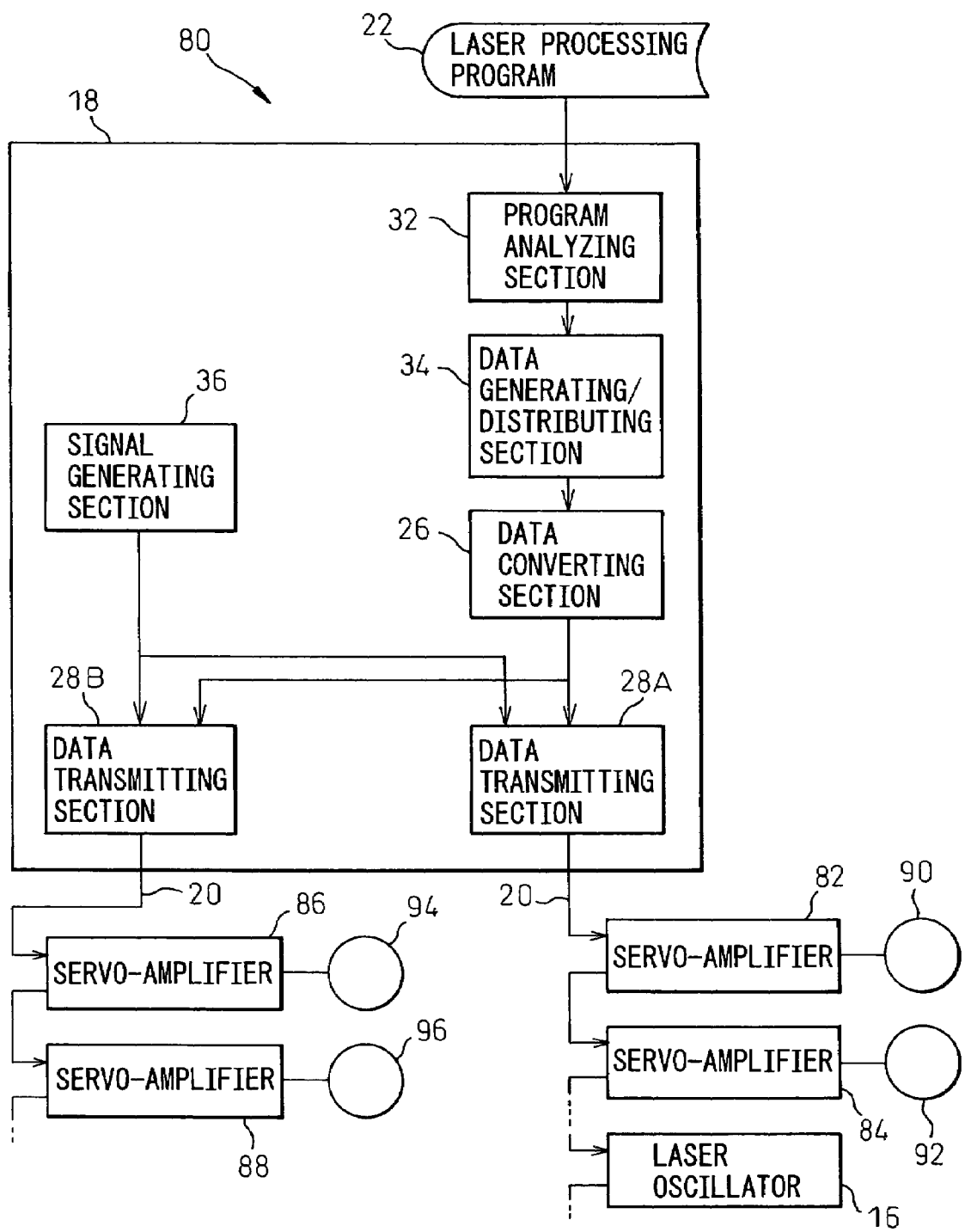
FIG. 5 is a functional block diagram showing a software configuration of a laser processing system according to a second embodiment of the present invention.

As a countermeasure, the present invention provides another configuration in which a plurality of transfer lines 20 are provided for the control unit 18, and a plurality of units are connected to the control unit 18 through the respective transfer lines in a daisy-chain mode. FIG. 5 shows a laser processing system 80 having this configuration, according to a second embodiment of the present invention. The laser processing system 80 has substantially the same configuration as that of the laser processing system 30 of FIG. 2, except for the provision of two daisy-chain mode transfer lines 20. Therefore, components corresponding to those of the laser processing system 30 of FIG. 2 are denoted by like reference numerals, and an explanation thereof is not repeated.

The laser processing system 80 includes a plurality of axis driving sections (i.e., servo-amplifiers 82, 84, 86, 88 and servomotors 90, 92, 94, 96), and two transfer lines 20 connecting respective two groups of axis driving sections, into which the plurality of axis driving sections are divided, to the control unit 18 in a daisy-chain mode. The control unit 18 includes two data transmitting sections 28A and 28B synchronously transmitting the serial data to two transfer lines 20, respectively, at a predetermined command cycle. The data transmitting sections 28A, 28B transmit the serial data to two transfer lines 20 in a mutually synchronized fashion, in a manner to follow a common synchronization signal generated by the signal generating section 36.

In the laser processing system 80 having the above configuration, two data transmitting sections 28A, 28B use the common synchronization signal, so that it is possible to synchronize the transfer timings of the serial data transferred through two transfer lines 20. Consequently, it is possible to increase the number of units (or the number of control axes) connected to the control unit 18 in the daisy-chain mode, without increasing the transfer speed in the interface of the control unit 18. As a result, it is possible for the laser processing machine 12 having a large number of control axes to perform a high-precision laser processing by various operations.

In the laser processing system according to the present invention, it is possible to adopt a configuration for permitting a laser output condition in a laser processing program to be changed at a designated timing, without waiting for the start of a subsequent command cycle, in the case where the change timing of the laser output condition does not coincide with the command cycle for a data transmission. In order to realize this configuration, in the laser processing system 10 shown in FIG. 1, the data preparing section 24 prepares command timing data for commanding the laser output-condition data included in the serial data to the laser oscillator 16 at a timing deviated from the predetermined command cycle. The data converting section 26 converts the motion data and laser output-condition data into the serial data, with the command timing data being attached to the laser output-condition data prepared by the data preparing section 24.

Figure 6:
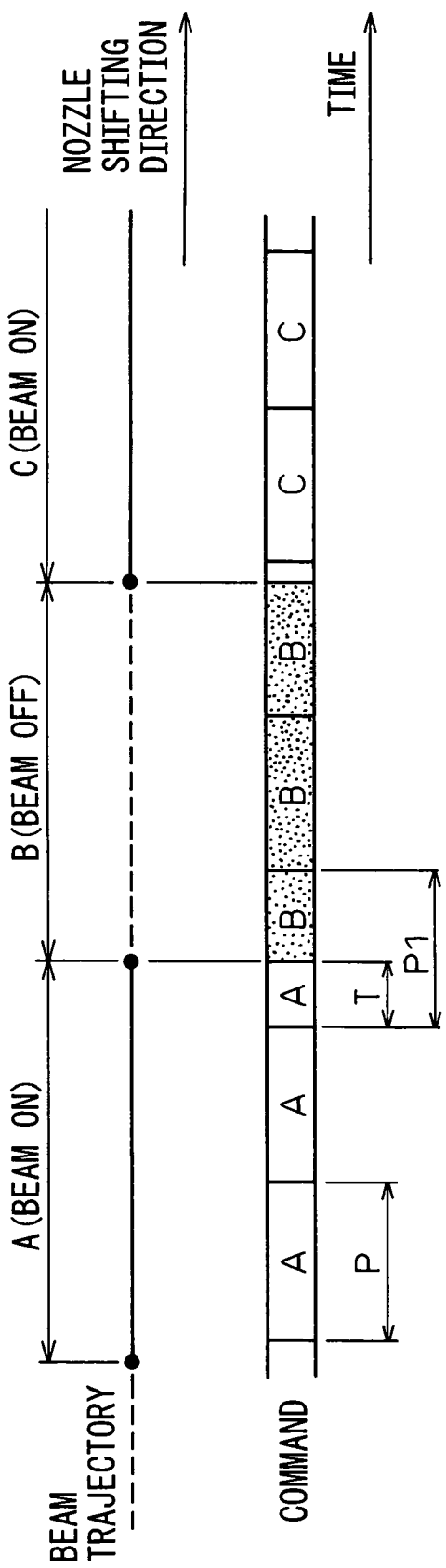
FIG. 6 is an illustration explaining a data changing process executed in the laser processing system according to a modification of the present invention.

As exemplary shown in FIG. 6, in the case where a processing nozzle emitting a laser beam moves in a single direction at a constant speed and performs a slitting process by repeating the emission (or beam-on) and the halting (or beam-off) of the laser beam at predetermined intervals (as illustrated by solid and broken lines as a beam trajectory), the motion data and the laser output-condition data are usually prepared to be segmented by a predetermined command cycle (or an interpolation cycle) and are commanded, so that, conventionally, the change in the laser output-condition data (e.g., from beam-on to beam-off) can be performed only when the command cycle is switched. However, in actual practice, the data change is often required in the middle of one command cycle P1, as illustrated.

To satisfy this requirement, according to the present invention having the above configuration, the serial data is prepared in such a manner that time information, from a start of the command cycle P1 involving the data change to the instant of the data change, is added as the command timing data to the laser output-condition data. In other words, the serial data in the command cycle P1 includes the motion command represented by a motion value in the single command cycle and the laser output-condition command represented by both a beam-off command and a command timing thereof (i.e., a waiting time T). Thus, the laser oscillator 16 can wait for the time T indicated by the command timing data from the start of the process in the command cycle P1, and thereafter change the laser output condition. As a result, it is possible to change the laser output condition at a desired timing, regardless of the command cycle of the serial data, and thereby to eliminate a processing error due to the delay in the changing process of the laser output condition.

Instead of the above configuration of attaching the command timing data to the laser output-condition data, another configuration may be adopted, such that data of the ratio between a motion value in a motion command before the data-change point in the command cycle P1 and a motion value in a motion command after the data-change point in the command cycle P1 is included in the serial data, which in turn is transferred to the laser oscillator 16. In this configuration, the laser oscillator 16 calculates the waiting time T on the basis of the data of the ratio of the motion values obtained from the serial data.

The laser processing systems 10, 30, 80, according to the present invention, employ the daisy-chain type transfer line, as one embodiment of the transfer line 20 for connecting the axis driving section 14 and the laser oscillator 16 to the control unit 18. However, the laser processing system according to the present invention is not limited to this arrangement, but can employ a transfer line having another connection mode, such as a bus connection, in place of the daisy-chain transfer line 20. For this arrangement, it is sufficient that the transfer line has a line configuration common to the axis driving section 14 and the laser oscillator 16, whereby it is possible to make the interface of the control unit 18 common to the axis driving section 14 and the laser oscillator 16. Accordingly, based on this arrangement, the characteristic effect equivalent to that of the laser processing device 10 shown in FIG. 1 can be obtained.

Further, in the above-described arrangement employing the transfer line having a connection mode other than the daisy-chain connection mode, a plurality of transfer lines may also be provided for the control unit 18 and a plurality of units can be connected to the control unit 18 through the transfer lines. With this arrangement, it is possible to increase the number of axis driving sections connected to the control unit 18, without increasing the transfer speed in the interface of the control unit 18. As a result, it is possible for a laser processing machine having a large number of control axes to perform a high-precision laser processing by various operations.

While the invention has been described with reference to specific preferred embodiments, it will be understood by those skilled in the art that various changes and modifications may be made thereto without departing from the scope of the following claims.

The invention claimed is:

1. A laser processing system comprising:
    a laser processing machine for operating along an inherent control axis;
    an axis driving section driving said control axis of said laser processing machine;
    a laser oscillator supplying a laser beam to said laser processing machine;
    a control unit controlling said axis driving section and said laser oscillator; and
    a transfer line connecting said axis driving section and said laser oscillator to said control unit in a daisy-chain mode;
    said control unit comprising:
        a data preparing section preparing, from a given laser processing program, motion data commanded to said axis driving section and laser output-condition data commanded to said laser oscillator;
        a data converting section converting said motion data and said laser output-condition data, prepared by said data preparing section, into serial data including said motion data and said laser output-condition data described in a time-series fashion, based on a communication data format common to said axis driving section and said laser oscillator; and
        a data transmitting section transmitting said serial data, obtained by said data converting section, to said transfer line at a predetermined command cycle common to said motion data and said laser output-condition data included in said serial data.

2. A laser processing system as set forth in claim 1, wherein said control unit further comprises a signal generating section generating a synchronization signal representing a transmission timing for said serial data in accordance with said command cycle; and wherein said data transmitting section transmits said serial data to said transfer line in a manner to follow said synchronization signal generated by said signal generating section.

3. A laser processing system as set forth in claim 1, comprising a plurality of axis driving sections, each of which is said driving section, and a plurality of transfer lines connecting respective groups of axis driving sections, into which said plurality of axis driving sections are divided, to said control unit in a daisy-chain mode; wherein said control unit comprises a plurality of data transmitting sections, each of which is said data transmitting section, synchronously transmitting said serial data to said plurality of transfer lines at said command cycle.

4. A laser processing system as set forth in claim 3, wherein said control unit further comprises a signal generating section generating a synchronization signal representing a transmission timing for said serial data in accordance with said command cycle; and wherein said plurality of data transmitting sections transmit said serial data to said plurality of transfer lines in a mutually synchronized fashion, in a manner to follow said synchronization signal common to said plurality of data transmitting sections and generated by said signal generating section.

5. A laser processing system as set forth in claim 1, wherein said data preparing section prepares command timing data for commanding said laser output-condition data included in said serial data to said laser oscillator at a timing deviated from said command cycle; and wherein said data converting section converts said laser output-condition data into said serial data by attaching said command timing data to said laser output-condition data.

6. A laser processing system comprising:
   a laser processing machine for operating along an inherent control axis;
   an axis driving section driving said control axis of said laser processing machine;
   a laser oscillator supplying a laser beam to said laser processing machine;
   a control unit controlling said axis driving section and said laser oscillator; and
   a transfer line common to said axis driving section and said laser oscillator and connecting said axis driving section and said laser oscillator to said control unit;
   said control unit comprising:
      a data preparing section preparing, from a given laser processing program, motion data commanded to said axis driving section and laser output-condition data commanded to said laser oscillator;
      a data converting section converting said motion data and said laser output-condition data, prepared by said data preparing section, into serial data including said motion data and said laser output-condition data described in a time-series fashion, based on a communication data format common to said axis driving section and said laser oscillator; and
      a data transmitting section transmitting said serial data, obtained by said data converting section, to said transfer line at a predetermined command cycle common to said motion data and said laser output-condition data included in said serial data.

7. A laser processing system as set forth in claim 6, comprising a plurality of axis driving sections, each of which is said driving section, and a plurality of transfer lines connecting respective groups of axis driving sections, into which said plurality of axis driving sections are divided, to said control unit; wherein said control unit comprises a plurality of data transmitting sections, each of which is said data transmitting section, synchronously transmitting said serial data to said plurality of transfer lines at said command cycle.

* * * * *